(12) United States Patent
Lim et al.

(10) Patent No.: US 7,062,266 B2
(45) Date of Patent: Jun. 13, 2006

(54) RADIO RESOURCES MANAGEMENT METHOD FOR WLL SYSTEM

(75) Inventors: Sung Gyu Lim, Kyungki-Do (KR); Taec Sung Kweon, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 706 days.

(21) Appl. No.: 09/948,693

(22) Filed: Sep. 10, 2001

(65) Prior Publication Data

US 2002/0034937 A1    Mar. 21, 2002

(30) Foreign Application Priority Data

Sep. 21, 2000  (KR) .......................... 2000-0055376
Oct. 27, 2000  (KR) .......................... 2000-0063341

(51) Int. Cl.
*H04Q 7/20* (2006.01)
(52) U.S. Cl. ................................ 455/426.2; 455/67.11
(58) Field of Classification Search ................ 455/421, 455/425, 426.2, 436, 435.1, 446
See application file for complete search history.

(56) References Cited

U.S. PATENT DOCUMENTS 5,905,950 A * 5/1999 Anell .......................... 455/421
5,952,966 A * 9/1999 Smith .......................... 342/373
6,266,528 B1 * 7/2001 Farzaneh ..................... 455/423

* cited by examiner

*Primary Examiner*—Ovidio Escalante
*Assistant Examiner*—Aung T. Win
(74) *Attorney, Agent, or Firm*—Fleshner & Kim, LLP (57) ABSTRACT

In a radio resources management method for a Wireless Local Loop (WLL) system, the compatibility of a radio environment can be judged by setting and storing information of a home base station, of a WLL subscriber terminal, and comparing the stored information with information of a base station currently relaying communications with the WLL subscriber terminal. Compatibility of the radio environment can also be judged by comparing the reception time intervals of a power ON/OFF message, position registration request message, or call processing request message with a reference time, at certain audit cycles.

27 Claims, 5 Drawing Sheets

RADIO RESOURCES MANAGEMENT METHOD FOR WLL SYSTEM

BACKGROUND OF THE INVENTION

1. Field of the Invention

The present invention relates to a Wireless Local Loop (WLL) system and, in particular, to a radio resources management method of a WLL system that is capable of managing radio resources efficiently.

2. Background of the Related Art

In general, a WLL system provides services such as voice communication, data communication, video communication, etc. to WLL subscribers by using Radio Frequency (RF) signals. A WLL system may typically be installed and operated in a region where it is difficult to install a wired telephone network.

A WLL system generally emulates a wired public telephone network by enabling local loop connections between a subscriber and the telephone network via radio communication channel rather than over wires.

Figure 1:
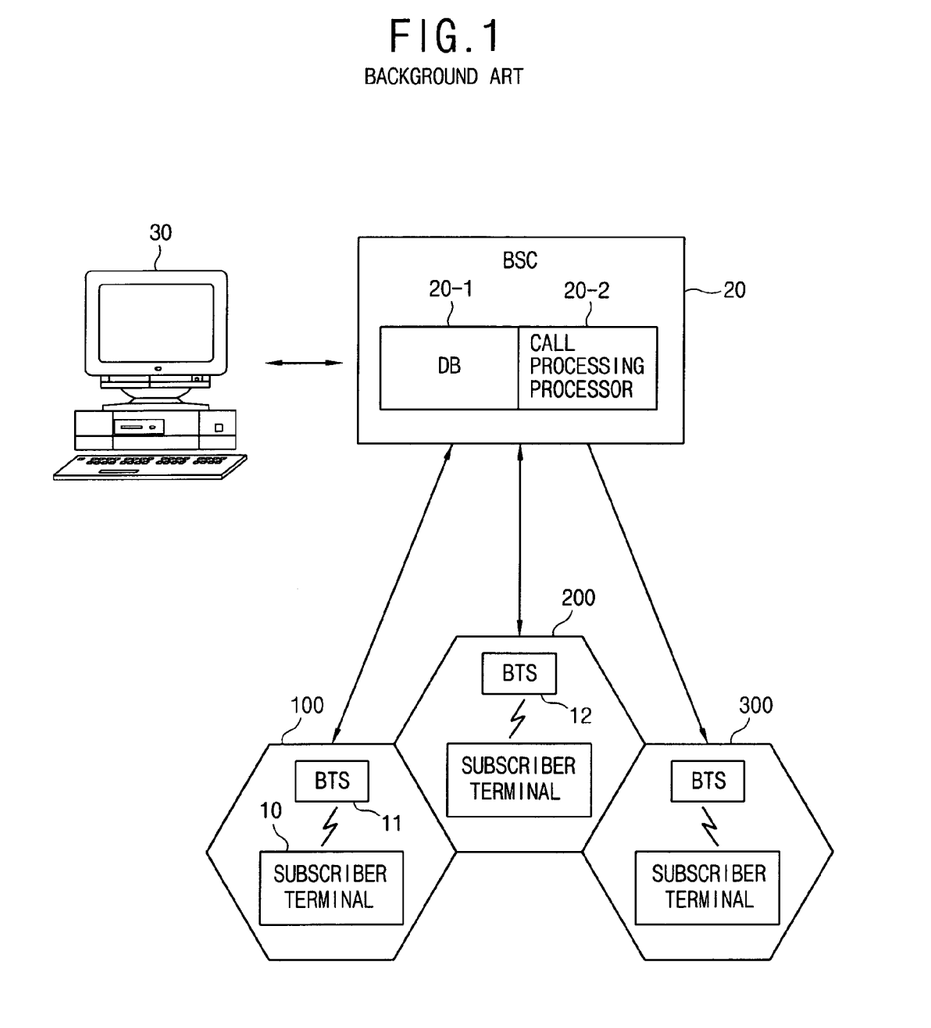
FIG. 1 illustrates a general WLL (Wireless Local Loop) system.

FIG. 1 is a schematic block diagram illustrating a general WLL system. The WLL system includes a subscriber terminal 10, a Base Transceiver Station (BTS) 11 providing the wireless connection to a WLL subscriber, synchronous maintenance, allocation and release of communication channels, etc. with the user terminal 10 through wireless communication, a Base Station Controller (BSC) 20 controlling the position information and state information of a subscriber by connecting with the BTS 11 through a Pulse Code Modulation (PCM) link, and a Man-Machine Controller (MMC) 30 supporting the input of user data and display of the state of the WLL system.

The WLL system is, for example, installed and operated in a region where it is difficult to adapt a wire telephone network. To support various communication services in the region, generally a base transceiver station is installed and operated, as depicted in FIG. 1. The operator of the WLL system establishes a cell plan, including the base transceiver stations, and creates initial subscriber information designating a home base station to the WLL subscribers of cells 100~300. The traffic volume of each cell can be set appropriately in consideration of the traffic characteristics of the region.

When subscriber information is created initially, the operator stores information of the home base station of each subscriber in a Data Base (DB) 20-1, of the BSC 20, through the MMC 30. A call processing processor 20-2 of the BSC 20 performs a call processing operation in accordance with various messages received from the subscribers and manages and updates position and state information of the subscribers stored in the DB 20-1. The position information is the position information of the subscriber terminal 10.

For example, when a power ON message or a subscriber position registration request message is received from the subscriber terminal 10, the call processing processor 20-2 of the BSC 20 manages the pertinent subscriber terminal 10 as being in an ATTACH/IDLE state. The subscriber position registration request message is periodically transmitted at a certain time interval. In addition, when a power OFF message is received from the subscriber terminal 10, the call processing processor 20-2 manages the subscriber terminal 10 as being in a DETACH/IDLE state. When a call processing request message is received, the call processing processor 20-2 manages the subscriber terminal 10 as being in an ATTACH/BUSY state, while performing operations such as a wireless contact, synchronous maintenance, allocation/release of communication channels, etc. As described above, when various messages are received from the subscriber terminal 10, the call processing processor 20-2 manages various subscribers efficiently by updating the position information and state information of the subscribers stored in the DB 20-1.

In the WLL system, there is a wireless region operated by the cell plan between a BTS and a terminal. An antenna of the BTS is placed so as to have constant directivity in consideration of the characteristics of the radio environment. However, because a BTS is always exposed to the natural environment, the directivity of the BTS antenna can be changed under the circumstances of rain, wind, etc. When the directivity of the antenna of the BTS 11 is changed, the BSC 20 may receive a request message transmitted from the terminal 10, not through the BTS 11 in the local cell in the region, but through a BTS 12 located in another cell. This may cause frequency loss and transmission delay and, accordingly, the communication quality in the wireless region and the reliability of the WLL system may be reduced.

In addition, the call processing processor 20-2 performs a call processing operation in accordance with a power ON/OFF message, a subscriber position registration request message, or a call processing request message received from the subscriber terminal 10. Additionally, it manages and updates the position and state information of a subscriber. However, the call processing operation can be performed only when a present subscriber terminal operates normally. When the subscriber terminal 10 operates abnormally, the WLL system not only can not appropriately manage the position and state information of a pertinent subscriber, in accordance with the plurality of request messages, but also can not take the necessary active measures corresponding to the abnormal state.

Accordingly, in the conventional WLL system, an abnormal state can not be sensed so that appropriate corrective action may be taken. When the radio resources allocated by the cell plan are in an abnormal state due to a change in the radio environment, the communication quality and reliability of the WLL system are reduced.

SUMMARY OF THE INVENTION

An object of the invention is to solve at least the above problems and/or disadvantages and to provide at least the advantages described hereinafter.

Accordingly, it is an object of the present invention to provide a radio resources management method for a WLL system which is capable of checking the state of radio resources accurately by the position information of a subscriber.

It is another object of the present invention to provide a radio resources management method for a WLL system that is capable of managing a WLL system efficiently by accurately detecting state variations of system radio resources caused by variations of the radio environment.

In order to achieve the above objects, there is provided a radio resources management method of a WLL system in accordance with the present invention including setting information of the home base stations of a plurality of subscribers according to a cell plan, storing the reception time of a request message and information of an actual base station of a subscriber when the request message is received from the subscriber, and judging the compatibility of the radio environment by comparing the stored information of the subscriber's home base station with the actual information of the base station or intervals of message reception time.

And, in order to achieve the above objects, there is also provided a radio resources management method of a WLL system in accordance with the present invention including setting information of the home base stations of a plurality of subscribers according to a cell plan, storing information of an actual subscriber's base station (i.e., base station communicating with the subscriber terminal at present) of a pertinent subscriber when a certain request message is received from the subscriber, and judging the compatibility of the radio environment by comparing the stored information of the subscriber's home base station with the information of the actual base station.

In addition, in order to achieve the above objects, there is provided a radio resources management method for a WLL system in accordance with the present invention including setting a subscriber audit cycle, storing a reception time of a pertinent request message when the pertinent request message is received from a subscriber, and judging the compatibility of the radio environment by comparing intervals of message reception time at each subscriber audit cycle.

The objects of the present invention can be achieved in whole or in part by a radio resources management method for a wireless local loop (WLL) system, including determining reference information regarding a subscriber terminal's communication with base stations of the WLL system, determining current information regarding the subscriber terminal's communication with the base stations of the WLL system, and determining an operational status of the WLL system, with respect to the subscriber terminal, based on the current and reference information.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The radio resources management method for a WLL system according to a preferred embodiment of the present invention can judge a normal state and an abnormal state of the radio resources, by using the position information of a WLL subscriber (terminal). More specifically, the method can judge the compatibility of a radio environment by setting and storing initial information of the home base station of each WLL subscriber and comparing the stored information with information of a base station communicating with the WLL subscriber at present.

In addition, the method can judge a normal and an abnormal state of the WLL system by using time information of a WLL subscriber. Specifically, the method can judge the compatibility of a radio environment by calculating the reception time intervals of messages, such as a power ON/OFF message, a position registration request message, a call processing request message, etc. for a particular audit cycle, and comparing the calculated time intervals with a reference time.

Figure 2:
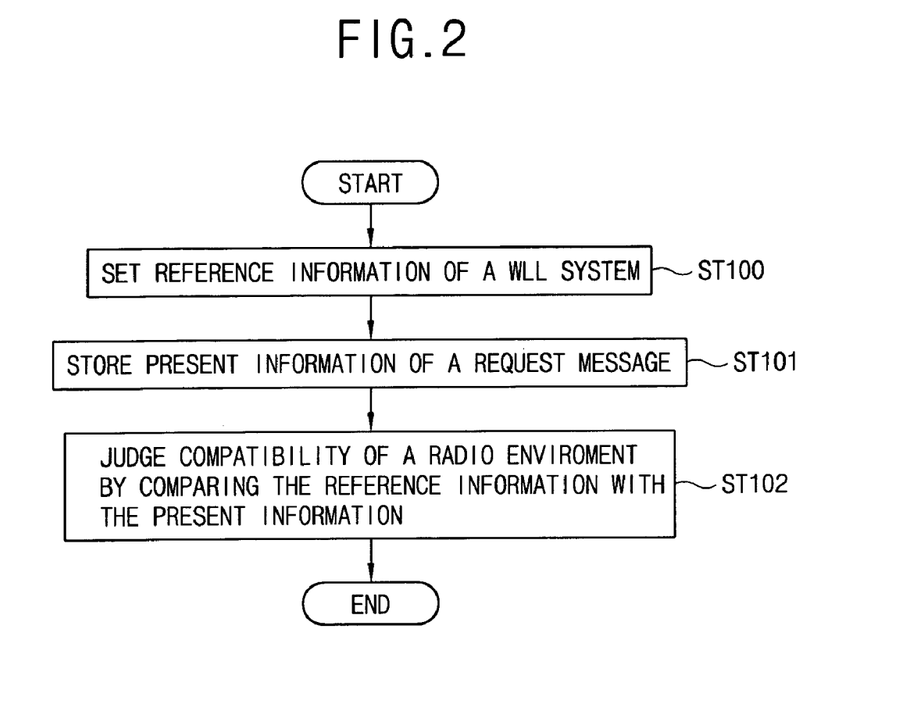
FIG. 2 illustrates a radio resources management method of a WLL system in accordance with a preferred embodiment of the present invention.

FIG. 2 is a flow chart illustrating a preferred embodiment of a radio resources management method of a WLL system in accordance with the present invention. In the cell-layout phase or when a new user subscribes to the WLL, an operator sets reference information of the WLL system using the MMC 30, as shown at ST100. Herein, "reference information of the WLL system" means information of the home base station of each subscriber terminal.

After the reference information is set, when one of a power ON/OFF, position registration request or call processing request messages is received from the subscriber terminal 10, a call processing processor 20-2 of the BSC 20 stores the reception time of the pertinent message and the present information of the WLL system, namely, information of the pertinent base station communicating with the terminal 10 at present, as shown at ST101. Accordingly, the call processing processor 20-2 can judge the compatibility of the present radio environment by comparing the stored reference information of the system with the present information or by comparing the message reception time intervals periodically or at every reception of a message, as shown at ST102.

Figure 3:
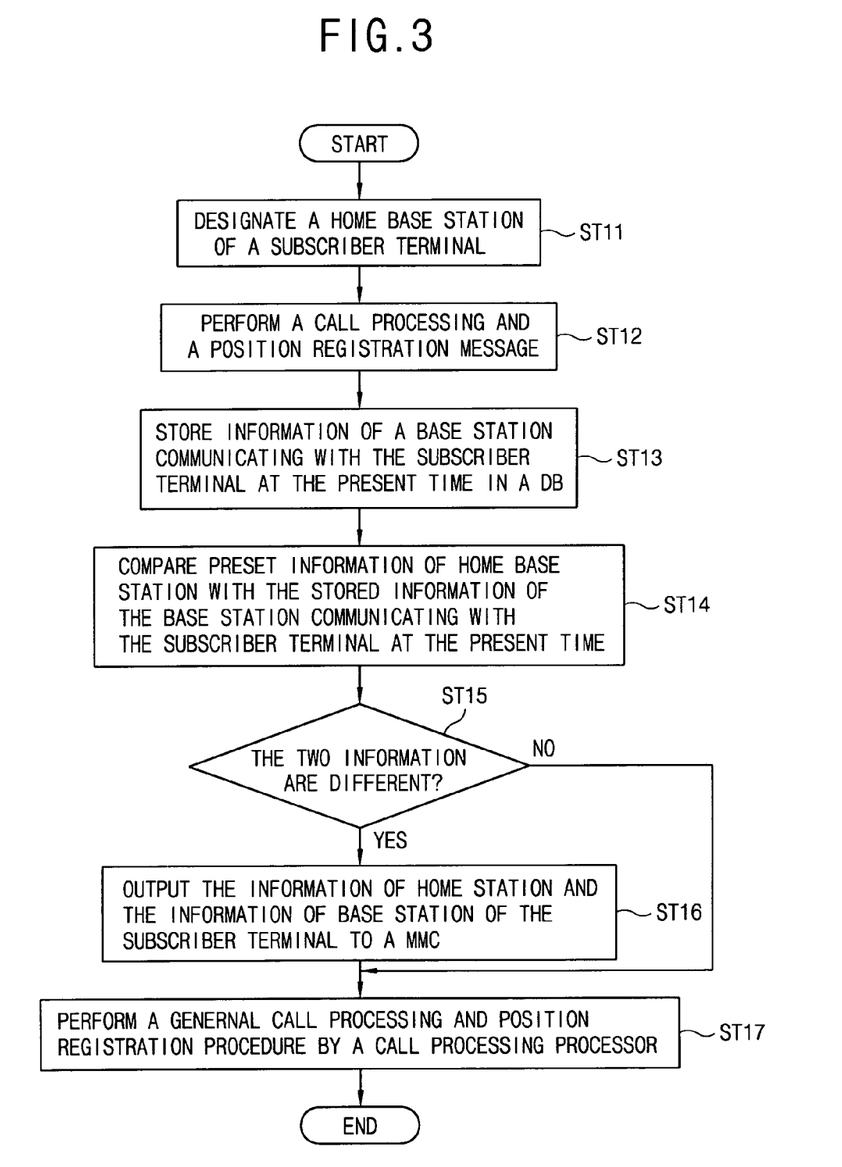
FIG. 3 illustrates a first embodiment of the radio resources management method shown in FIG. 2.

FIG. 3 is a flow chart depicting a first embodiment of the radio resources management method of the WLL system shown in FIG. 2. An operator of the WLL system establishes position information of a subscriber by using the MMC 30 in planning the cell-layout or when there is a new subscriber, as shown at ST11. Herein, "position information of a subscriber" means information of the home base station of each subscriber terminal. The home base station of the terminal 10 is a BTS 11. The initially set subscriber position information is stored in the DB 20-1, of the BSC 20, through the MMC 30. After that, the subscriber terminal 10 transmits various request messages such as a power ON/OFF message, a position registration request message, a call processing request message, etc. by radio communication with the BTS 11.

When a request message is input from the subscriber terminal 10 to the call processing processor 20-2, as shown at ST12, the call processing processor 20-2 stores the actual position information of the subscriber terminal in DB 20-1. This information identifies the base station communicating with the subscriber terminal 10 at the present time, as shown at ST13. The call processing processor 20-2 then reads the information of the base station stored in the DB 20-1 and determines whether the base station communicating with the terminal 10 at the present time is the same as the preset home base station, as shown at ST14, 15. If it is determined that the two base stations are different (i.e., the base station communicating with the subscriber terminal 10 at the present time is not the home (preset) base station), the call processing processor 20-2 judges the radio environment at the subscriber side as being in an abnormal state. When it is determined that the two base stations are same (i.e., the base station communicating with the subscriber terminal 10 at the present time is the home (preset) base station), the call processing processor 20-2 judges the radio environment at the subscriber side as being in a normal state. Herein, when the radio environment is in the abnormal state, it means that the subscriber terminal 10 performs a communication not with its home cell BTS 11 but with another BTS 12.

When the radio environment is confirmed as being in an abnormal state, the call processing processor 20-2 notifies the operator by outputting to the MMC 30 the pertinent subscriber number, information of the home base station of the pertinent subscriber, and information of the base station used at present, as shown at ST16. Accordingly, the operator can adjust the direction of an antenna of the home cell BTS 11 of the pertinent subscriber or change the home cell base station of the pertinent subscriber to the BTS 12 used at that time.

In the meantime, when the radio environment is judged to be in the normal state or when the notification about the abnormal state of the radio environment is ended, the call processing processor 20-2 performs normal processing of messages output from the subscriber terminal 10, such as a power ON/OFF message, a position registration request message, a call processing request message, etc., as shown at ST17.

As described above, the radio resources management method for the WLL system in accordance with the first embodiment of the present invention can judge the compatibility of the radio environment (resources) by checking whether or not the radio resources allocated by the cell plan are properly operating as planned.

Figure 4:
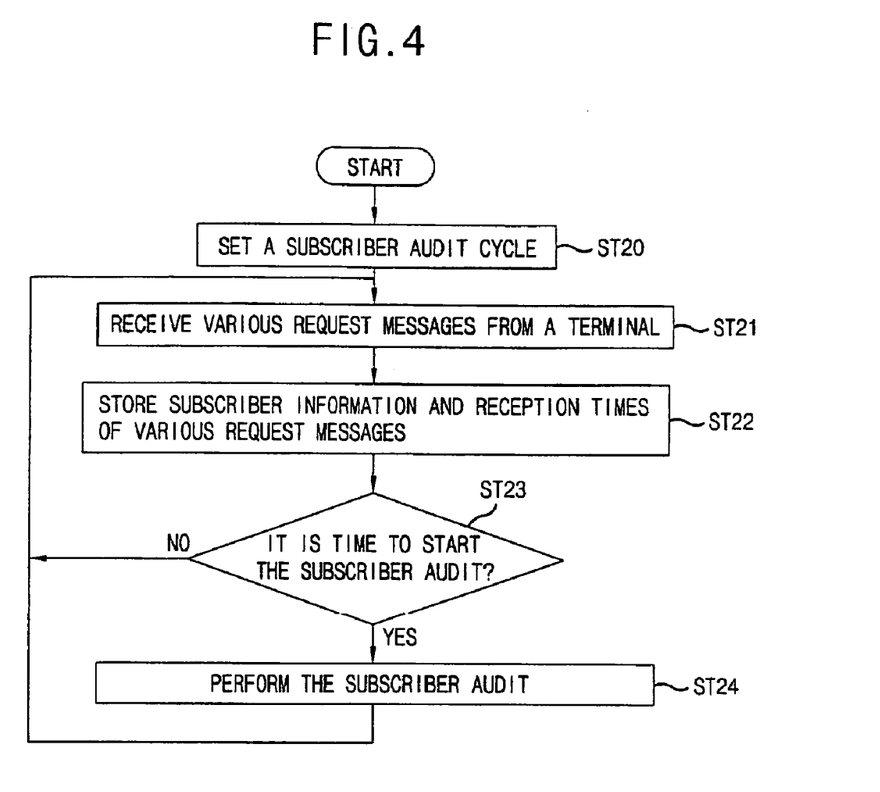
FIG. 4 illustrates a second embodiment of the radio resources management method shown in FIG. 2.

FIG. 4 is a flow chart illustrating a second embodiment of the radio resources management method of the WLL system shown in FIG. 2.

As depicted in FIG. 4, the operator of the WLL system establishes a subscriber audit cycle, using the MMC 30, as shown at ST20, and stores it in the DB 20-1 of the BSC 20. The subscriber audit cycle can be set variously in accordance with the types of request messages and the operating environment of the WLL system. For example, different subscriber audit cycles can be adopted in accordance with a power ON/OFF message, a position registration request message, and a call processing request message. Also, the subscriber audit cycle established for a poor radio environment region can differ from the audit cycle established for a good radio environment region. In addition, the same subscriber audit cycle can be adopted for all subscribers.

When various request messages such as a power ON/OFF message, a position registration request message, a call processing request message, etc. are received from the subscriber terminal 10, the call processing processor 20-2 of the BSC 20 performs a call processing operation in accordance with the received message. Additionally, it stores position information of the subscriber terminal, state information of the subscriber terminal, and the reception time of the request message in the DB 20-1, as shown at ST21, ST22. After that, information stored in the DB 20-1 is automatically updated and managed whenever a request message is received. The call processing processor 20-2 checks whether it is time to start the subscriber audit and, when it is time, a pertinent audit process is performed, as shown at ST23, ST24.

Figure 5:
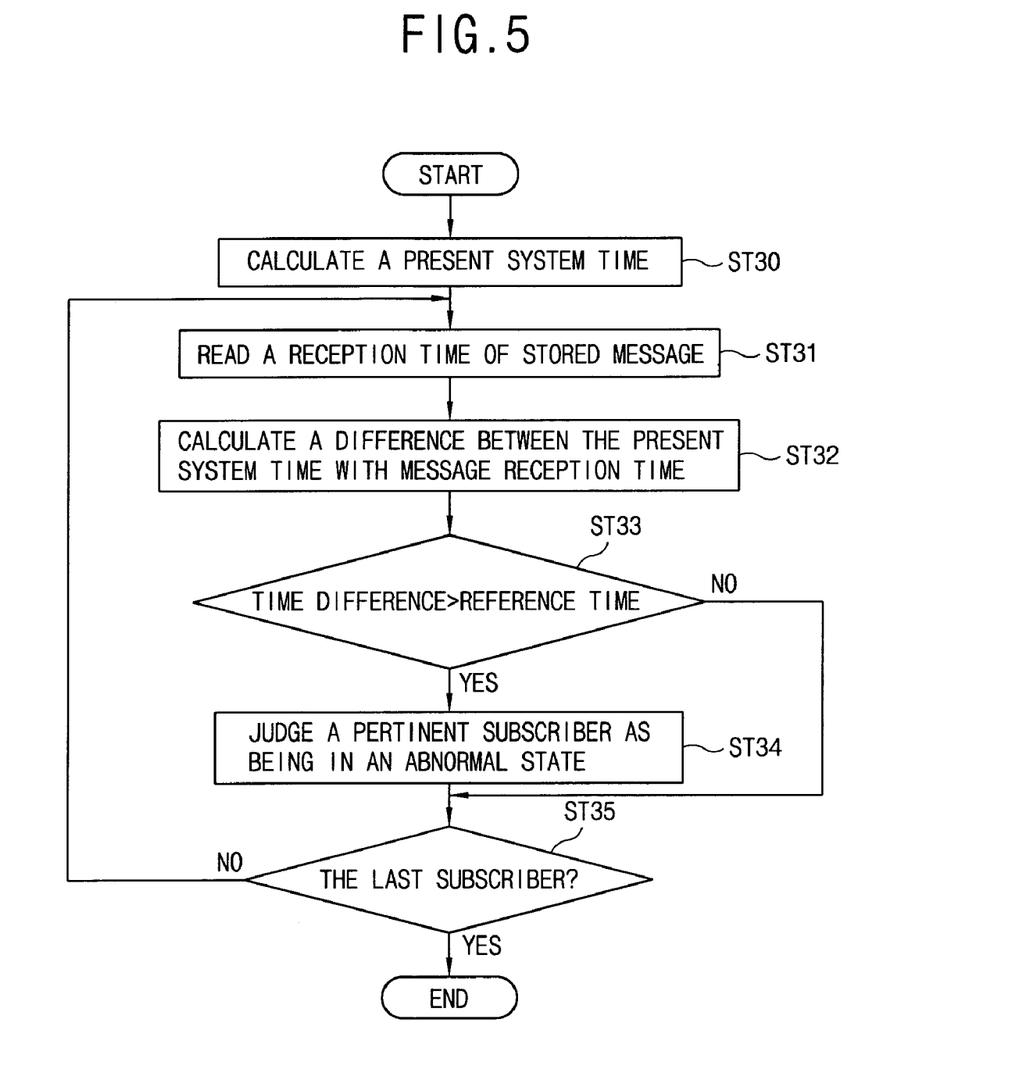
FIG. 5 illustrates the detailed operation of a call processing processor of the second embodiment shown in FIG. 4.

FIG. 5 is a flow chart illustrating the detailed audit operation performed by the call processing processor 20-2, in accordance with the second embodiment of the present invention shown in FIG. 2. When it is time to start the subscriber audit, the call processing processor 20-2 determines the present system time first, as shown at ST30. Then, it reads time information of the pertinent subscriber terminal 10 from the DB 20-1, as shown at ST31, and calculates the time difference between the system time and the time information of the pertinent subscriber terminal 10, as shown at ST32. Herein, the time information stored in the DB 20-1 is the reception time of a last message received from the terminal 10.

When the time difference is calculated, the call processing processor 20-2 compares the calculated time difference with a reference time, as shown at ST33. If the time difference is greater than the reference time, in other words, a message has not been received from a subscriber terminal for a specific period of certain time, the pertinent subscriber terminal 10 is judged as being in an abnormal state, as shown at ST34. When the state of the pertinent subscriber terminal is confirmed as being abnormal, the call processing processor 20-2 changes the state information of the pertinent subscriber terminal stored in the DB 20-1 into a DETACH/IDLE state and notifies the operator of the changed subscriber information, through the MMC 30.

On the other hand, when the time difference is smaller than the reference time, that is, when a message has been received from the subscriber terminal within a specific period of time, the pertinent subscriber terminal is regarded as being in a normal state. The subscriber terminal information stored in the database is not changed when the respective terminal is in a normal state.

Accordingly, the call processing processor 20-2 judges the compatibility of the radio environment by performing the above-described operation for a plurality of subscribers or for all subscribers repeatedly, as shown at ST35. Furthermore, the radio resources management method for the WLL system can judge the compatibility of the radio environment by checking whether a message is normally received from a pertinent terminal. Additionally, although a subscriber audit cycle has been described with regard to the second embodiment of the invention, the use of the same or a different audit cycle methodology can be adopted in the first embodiment.

As described above, the preferred methods of the present invention enable appropriate maintenance and repair of the radio environment in a WLL system and improve the reliability of the WLL system by more accurately judging a normal and an abnormal state of the system radio resources, using position information and time information of a WLL subscriber (terminal).

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A radio resources management method for a Wireless Local Loop (WLL) system, comprising:
   setting reference information of the WLL system according to a cell plan;
   storing present information of a request message when the request message is received from a subscriber terminal;
   judging a compatibility of a radio environment of the WLL system by comparing the set reference information with the present information of the received request message to determine if the radio environment is in an abnormal or normal state; and adjusting a direction of an antenna of a home cell base station of the subscriber terminal in the WLL system when the radio environment is determined to be in the abnormal state, wherein the abnormal state of the radio environment corresponds to a directivity of the antenna of the home cell base station being altered due to the abnormal state of the radio environment.

2. The method of claim 1, further comprising:
setting an audit cycle for auditing an operation of the subscriber terminal.

3. The method of claim 2, wherein the audit cycle is set differently in accordance with an operation environment of the WLL system and a type of the request message.

4. The method of claim 1, wherein the reference information includes information of at least one of the home cell base station of the subscriber terminal and a message reception time from the subscriber terminal.

5. The method of claim 1, wherein the present information includes information of at least one of a base station, relaying the request message from the subscriber terminal at present, and message reception time intervals.

6. The method of claim 1, wherein the request message is one of a power ON/OFF message, a position registration request message, or a call processing request message.

7. The method of claim 1, wherein judging the compatibility further comprises:
checking whether information of the home cell base station of the subscriber terminal, contained in the reference information, is the same as a present base station corresponding to the present information;
processing the request message when the reference information and the present information are the same; and
notifying an operator of a subscriber terminal number, the home cell base station, and the present base station when the set reference information and the present information are different.

8. The method of claim 2, wherein judging the compatibility further comprises:
determining a present time during an auditing portion of the audit cycle;
determining a time difference between the present time and a message reception time of the request message received from the subscriber terminal; and
judging a state of the subscriber terminal by comparing the time difference with a reference time.

9. The method of claim 8, wherein the state of the subscriber terminal is judged an abnormal state when the time difference is greater than the reference time.

10. The method of claim 8, wherein the message reception time is a reception time of a last-received message from the subscriber terminal.

11. A radio resources management method for a Wireless Local Loop (WLL) system, comprising:
setting first position information of a plurality of subscriber terminals in accordance with a cell plan;
storing second position information of a pertinent one of the plurality of subscriber terminals, when a particular request message is received from the pertinent subscriber terminal;
judging a compatibility of a radio environment by comparing the first and second position information to determine if the radio environment is in an abnormal state; and
adjusting a direction of an antenna of a home base station corresponding to the first position information based on juding the compatibility of the radio environment,
wherein the abnormal condition of the radio environment corresponds to a directivity of the antenna of the home cell base station being altered due to the abnormal state of the radio environment.

12. The method of claim 11, wherein the particular request message is a power ON/OFF message, a position registration request message, or a call processing request message.

13. The method of claim 11, wherein the first position information includes information of the home cell base station and the pertinent subscriber terminal and the second position information includes information of a present base station that currently relays messages with the pertinent subscriber terminal.

14. The method of claim 11, wherein judging the compatibility further comprises:
judging whether the first and second position information are the same;
processing the particular request message when the first and second position information are judged the same; and
notifying an operator of a subscriber terminal number and the first and second position information, when the first and second position information are different.

15. A radio resources management method for a Wireless Local Loop (WLL) system, comprising:
setting repeating subscriber audit cycles;
storing a reception time for each of a plurality of pertinent request messages when the pertinent request message is received from a subscriber terminal;
judging a compatibility of a radio environment by comparing intervals of the reception times at each of the repeating subscriber audit cycles;
determining the radio environment to be in an abnormal state when the intervals of the reception times are judged to exceed a reference time; and
changing a direction of an antenna used in a home base station corresponding to the subscriber terminal when the radio environment is judged to be in the abnormal state,
wherein the abnormal condition of the radio environment corresponds to a directivity of the antenna of the home cell base station being altered due to the abnormal state of the radio environment.

16. The method of claim 15, wherein the repeating subscriber audit cycles are set differently in accordance with an operation environment of the WLL system and a type of each of the plurality of pertinent request messages.

17. The method of claim 15, wherein each of the plurality of pertinent request messages is a power ON/OFF message, a position registration request message, or a call processing request message.

18. The method of claim 15, wherein the stored reception time is of a last-received message of the plurality of pertinent request messages.

19. The method of claim 15, wherein the compatibility judging process further comprises:
checking whether it is time to start an auditing operation within each of the repeating subscriber audit cycles;
determining a present time during the auditing operation;
calculating a difference between the present time and the reception time of a last-received message of the plurality of pertinent request messages; and
judging a state of the environment by comparing the calculated time difference with the reference time.

20. A radio resources management method for a wireless local loop (WLL) system, comprising:
- determining reference information regarding a subscriber terminal's communication with base stations of the WLL system;
- determining current information regarding the subscriber terminal's communication with the base stations of the WLL system;
- determining an operational status of the WLL system, with respect to the subscriber terminal, based on the current and reference information;
- setting an abnormal operation signal to inform the WLL system operator of an abnormal condition of the operational status, when the current and reference information differ by a predetermined extent; and
- adjusting a propagation characteristic of an antenna included in a current base station communicating with the subscriber terminal, when the operational status is in the abnormal condition for the subscriber terminal,
- wherein the abnormal condition corresponds to a directivity of the antenna of a home base station being altered due to the abnormal state of the radio environment.

21. The method of claim 20, further comprising establishing the reference information when either a cell plan for the WLL system is created or the subscriber terminal is operationally integrated into the WLL system.

22. The method of claim 20, further comprising:
- communicating request messages between the subscriber terminal and a number of the base stations of the WLL system; wherein
- the current information contains information pertaining to a current request message of the request messages, and
- the reference information contains information pertaining to a previous request message of the request messages.

23. The method of claim 20, wherein:
- the reference information includes at least one of the home base station of the base stations and a reference message reception interval; and
- the current information includes at least one of a current base station, which currently communicates with the subscriber terminal, and a current message reception interval.

24. The method of claim 23, further comprising:
- setting an abnormal operation signal to inform a WLL system operator of an abnormal condition when the home base station and the current base station differ; and
- setting the abnormal operation signal to inform the WLL system operator of the abnormal condition when the current message reception interval exceeds the reference message interval by a predetermined amount, wherein
- the current message reception interval identifies a period of elapsed time between a series of request messages communicated between the subscriber terminal and a number of the base stations.

25. The method of claim 22, wherein:
- the reference information includes at least one of the home base station of the base stations and a reference message reception interval; and
- the current information includes at least one of a current base station, which currently communicates with the subscriber terminal, and a current message reception interval.

26. The method of claim 25, further comprising:
- setting an abnormal operation signal to inform a WLL system operator of an abnormal condition when the home base station and the current base station differ; and
- setting the abnormal operation signal to inform the WLL system operator of the abnormal condition when the current message reception interval exceeds the reference message reception interval by a predetermined amount, wherein
- the current message reception interval identifies a period of elapsed time between a current series of request messages recently communicated between the subscriber terminal and a first number of the base stations,
- the reference message reception interval identifies a period of elapsed time between a reference series of request messages communicated between the subscriber terminal and a second number of the base stations, previous to the recently communicated request messages.

27. The method of claim 20, further comprising occasionally comparing the current information and the reference information to determine the operational status of the WLL system, according to a schedule.

* * * * *